(12) United States Patent
Gow

(10) Patent No.: US 9,609,946 B2
(45) Date of Patent: Apr. 4, 2017

(54) TABLE ARRANGEMENT

(71) Applicant: Zodiac Seats UK Limited, Cwmbran (GB)

(72) Inventor: Robert Gow, Chepstow (GB)

(73) Assignee: Zodiac Seats UK Limited, Cwmbran (GB)

( * ) Notice: Subject to any disclaimer, the term of this patent is extended or adjusted under 35 U.S.C. 154(b) by 4 days.

(21) Appl. No.: 14/725,449

(22) Filed: May 29, 2015

(65) Prior Publication Data

US 2015/0351528 A1 Dec. 10, 2015

(30) Foreign Application Priority Data

Jun. 9, 2014 (GB) .................................. 1410203.2

(51) Int. Cl.
| | |
|---|---|
| *A47B 23/00* | (2006.01) |
| *A47B 5/00* | (2006.01) |
| *A47B 31/06* | (2006.01) |
| *B64D 11/06* | (2006.01) |
| *B60N 3/00* | (2006.01) |

(52) U.S. Cl.
CPC .............. *A47B 5/006* (2013.01); *A47B 31/06* (2013.01); *B60N 3/002* (2013.01); *B64D 11/0605* (2014.12)

(58) Field of Classification Search
CPC .. A47C 7/70; A47C 7/68; A47B 31/06; A47B 31/00
USPC ............... 297/162, 160, 145, 146, 147, 155; 108/44, 42, 152, 115, 50.01, 50.02
See application file for complete search history.

(56) References Cited

U.S. PATENT DOCUMENTS

| | | | | | |
|---|---|---|---|---|---|
| 2,518,381 | A | * | 8/1950 | Runkles | A47C 7/70 297/145 |
| 3,371,956 | A | * | 3/1968 | Jordan | A47C 7/70 297/162 |
| 3,408,104 | A | * | 10/1968 | Raynes | A47C 7/70 248/206.5 |
| 3,598,442 | A | * | 8/1971 | Miller | A47C 7/70 16/364 |
| 3,632,161 | A | * | 1/1972 | Arfaras | A47C 7/70 297/145 |

(Continued)

FOREIGN PATENT DOCUMENTS

| | | |
|---|---|---|
| WO | 2009040247 A1 | 4/2009 |
| WO | 2013144845 A2 | 10/2013 |

*Primary Examiner* — Jose V Chen
(74) *Attorney, Agent, or Firm* — Kilpatrick Townsend & Stockton LLP; Dean W. Russell

(57) ABSTRACT

A table arrangement including a support member rotatably mounted to a base structure, a table element translatably mounted to the support member, and a locking mechanism is described. The locking mechanism may include a first locking member connected to the support member to rotate with the support member between non-aligned and aligned configurations with respect to the second locking member, and a second locking member. The first or second locking member may be translatably mounted with respect to the other locking member between a first engagement position and a second engagement position, wherein, when the first locking member is in the aligned configuration, the first or second locking member can translate into the second engagement position. The table arrangement may be deployed and stowed.

30 Claims, 12 Drawing Sheets

(56) References Cited

U.S. PATENT DOCUMENTS

| | | | | |
|---|---|---|---|---|
| 4,372,604 | A * | 2/1983 | Raksanyi | B61D 33/005 297/145 |
| 4,834,449 | A * | 5/1989 | Engelman | A47B 3/14 108/134 |
| 7,478,868 | B2 * | 1/2009 | Figueras Mitjans | A47C 7/70 297/145 |
| 8,109,566 | B2 * | 2/2012 | Koh | A47C 7/70 297/145 |
| 8,528,968 | B2 * | 9/2013 | Moulton | B64D 11/0605 297/147 |
| 8,746,788 | B2 * | 6/2014 | Su | A47C 7/70 297/162 |
| 8,801,638 | B2 * | 8/2014 | Gierse | A61G 5/14 297/145 |
| 2007/0227407 | A1 | 10/2007 | Cartensen | |
| 2009/0026812 | A1 * | 1/2009 | Figueras Mitjans | A47C 7/70 297/162 |
| 2009/0223417 | A1 | 9/2009 | Muirhead | |
| 2010/0231009 | A1 * | 9/2010 | Chi | A47C 7/407 297/155 |
| 2014/0145477 | A1 * | 5/2014 | Ersan | B64D 11/06 297/145 |

* cited by examiner

TABLE ARRANGEMENT

CROSS REFERENCE TO RELATED APPLICATIONS

This application claims the benefit of Great Britain Patent Application 1410203.2, filed Jun. 9, 2014, titled "A Table Arrangement," the entire contents of which is hereby incorporated by reference.

BACKGROUND OF THE INVENTION

The present invention concerns a table arrangement. More particularly, but not exclusively, this invention concerns a table arrangement comprising a base structure, a support member, rotatably mounted to the base structure such that the support member can rotate between first and second rotation configurations, and a table element, having a table surface, the table element being translatably mounted to the support member such that the table element can translate transversely to the support member, between first and second transverse positions. The invention also concerns an aircraft comprising the table arrangement and methods of deploying and stowing a table arrangement.

In general, table arrangements, particularly on aircraft, and for use by a passenger of a business of first class seat, tend to be mounted in a housing of a seat module and a table element of the table arrangement is moveable from a stowed position (often within the housing) to a deployed (useable) position. Depending on the design of the seat module and the location of the seat and the housing, the table arrangement has to be designed to allow the table element to move from the stowed position to a suitable useable position with respect to the passenger seat. This may involve a series of motions of the table element, for example including rotation and translation of the table element.

Often, these motions need to occur in a specific order in order to deploy or stow the table element. For example, the table element may have to be slid out vertically from the housing before it can be rotated to be horizontal and may need to be rotated to vertical before being slid back into the housing. Otherwise, the table element may collide with sides/surround of the housing and cause damage.

Also, if a table element is to be translated transverse to a support rod, the centre of gravity of the table element moves to a different side of the support rod, and this may cause the support rod to rotate, when such movement is not wanted.

Hence, it is desired to isolate different motions of the table element so that motions are prevented from occurring at the same time.

The present invention seeks to mitigate the above-mentioned problems. Alternatively or additionally, the present invention seeks to provide an improved table arrangement.

SUMMARY OF THE INVENTION

The present invention provides, according to a first aspect, a table arrangement comprising a base structure, a support member, rotatably mounted to the base structure such that the support member can rotate between first and second rotation configurations, and a table element, having a table surface, the table element being translatably mounted to the support member such that the table element can translate transversely to the support member, between first and second transverse positions, wherein the table arrangement also comprises a locking mechanism comprising a first locking member, and a second locking member, wherein the first locking member is connected to the support member such that it rotates with the support member between non-aligned and aligned configurations with respect to the second locking member, and wherein the first or second locking member is translatably mounted with respect to the other locking member such that the first or second locking member can translate between a first engagement position and a second engagement position, wherein, when the support member is rotated towards the second rotation configuration, the first locking member rotates towards the aligned configuration, and wherein, when the first locking member is in the aligned configuration, the first or second locking member can translate into the second engagement position.

Here, "translate" means that the relevant element (e.g. table element, first or second locking member) moves from a first position to a spatially different second position. Such motion could be achieved by sliding or by rotation about an (off-centre) axis or a combination.

Such an arrangement means that the first or second locking member can only translate (and therefore could allow a translation of the table element) after the support member is rotated to the second rotation configuration.

Preferably, it is the second locking member that is translationally mounted in relation to the first locking member.

Preferably, the table element is translated with respect to the support member in a substantially horizontal direction, preferably, with the table surface in a substantially horizontal orientation.

Preferably, the first rotation configuration is a more stowed (for example, a substantially vertical orientation of the table element, for example for stowage in a vertical housing) configuration of the table arrangement and the second rotation configuration is a more deployed (for example a substantially horizontal orientation of the table element, fully rotated, useable) configuration of the table arrangement.

Preferably, the first transverse position is a more stowed (for example, where the table element is in a transverse position with respect to the support member that it is in when stowed, for example a further from the passenger seat) position of the table arrangement and the second transverse position is a more deployed (for example, where the table element is in a transverse position with respect to the support member that it is in when deployed, for example useable or nearer the passenger seat) position of the table arrangement.

Preferably, the first engagement position of the (first or) second locking member is a disengaged position (where the (first or) second locking member is not engaged with the other locking member).

Preferably, the second engagement position of the (first or) second locking member is an engaged position (where the (first or) second locking member is engaged with the other locking member to prevent rotation of the first locking member). Such an arrangement means that when the (first or) second locking member is engaged (and may allow translation of the table element), the first locking member (and also the support member) cannot rotate. Hence, rotating of the support member may be prevented whilst translation of the table element is occurring.

Preferably, the second locking member translates between a first engagement position and a second engagement position in a longitudinal direction of the support member.

Preferably, the first and second locking members comprise a female locking member and a corresponding male locking member. More preferably, the first locking member is a female locking member and the second locking member is a corresponding male locking member.

Preferably, the female locking member is a locking disc with a locking slot. More preferably, the male locking member is a locking pin corresponding to the locking slot.

Preferably, the first locking member or the support member has a stop portion such that the first locking member is stopped from further rotation when the first locking member reaches the aligned configuration. This allows a user to rotate the support member such that the first locking member is in the aligned configuration, but no further. It therefore ensures that the first and second locking members are aligned if the support member is rotated as far as it will go in that direction. More preferably, a corresponding stop portion is on the base structure or second locking member.

Preferably, the locking mechanism prevents translation of the table element between the first and second transverse positions, when the support member is in at least one configuration other than the second rotation configuration.

More preferably, the locking mechanism prevents translation of the table element, when the support member is in any rotation configuration between the first and second rotation configurations, other than the second rotation configuration. In other words, the table element may be prevented from translating towards its more deployed position until the support member is fully rotated to the more deployed rotation configuration.

Preferably, the locking mechanism prevents rotation of the support member, when the table element is in at least one position other than the first transverse position.

More preferably, the locking mechanism prevents rotation of the support member, when the table element is in any transverse position between the first and second transverse positions, other than the first transverse position. In other words, the support member may be prevented from rotating towards its more stowed configuration until the table element is fully translated to the more stowed transverse position.

Preferably, the table element is mounted to the support member such that it rotates with the support member, when the support member rotates between first and second rotation configurations. The table element, and table surface, may thus be rotated from a more stowed (for example, substantially vertical) position to a more deployed (for example, where the table surface is substantially horizontal, in a useable) position.

Preferably, the table element is rotated to a substantially horizontal position when the support member rotates to the second rotation configuration. Preferably, the table element is rotated to a substantially vertical position when the support member rotates to the first rotation configuration.

Preferably, the support member is rotatably mounted to the base structure such that the support member rotates (for example about its longitudinal axis) between the first and second rotation configurations.

Preferably, the table arrangement further comprises a first abutment member connected to the table element, and a second, corresponding abutment member connected to the first or second locking member, wherein, the first or second abutment member is translatably mounted such that it can translate between an abutting position, where the abutment members abut such that the table element is prevented from translating between the first and second transverse positions, and a non-abutting position, where the abutment members do not abut, and wherein, when the first or second abutment member is translated from the abutting position to the non-abutting position, the first or second locking member is caused to translate from the first engagement position to the second engagement position.

Here, "translate" means that the relevant element (e.g. first or second abutment member) moves from a first position to a spatially different second position. Such motion could be achieved by sliding or by rotation about an (off-centre) axis or a combination.

More preferably, the second abutment member is connected to the second locking member. More preferably, it is the second abutment member that is translatably mounted. The second abutment member may translate and cause the second locking member to translate from the first engagement position to the second engagement position.

Such an arrangement allows that when the second abutment member is translated to the non-abutting position (and therefore allow the table element to translate), the (first or) second locking member engages with the other locking member to prevent rotation of the support member. Hence, if the table element is able to translate, the support member must be in the second rotation configuration and is not able to rotate. This prevents the support member rotating, for example when translation of the table element has caused the centre of gravity of the table element to move from one side of the support member to the other side of the support member (i.e. when the centre of gravity moves over the axis of rotation of the support member). Also, in the abutting position, the table element cannot translate, but the support member can still rotate (as the (first or) second locking member is not engaged with the other locking member).

Preferably, the second abutment member translates between the abutting and non-abutting positions in a longitudinal direction of the support member.

Preferably, one of the first and second abutment members is a first cam surface and the other of the first and second abutment members is a cam follower.

More preferably, the cam surface is angled so as to have both a transverse and a longitudinal (in a longitudinal direction of the support member) component. Therefore, as the table element is translated transversely towards the second transverse position, this causes the cam follower to follow the angled cam surface. This causes the second abutment member (connected to the second locking member) to move longitudinally (in a longitudinal direction of the support member), to the non-abutting position, and also cause the second locking member to move longitudinally to engage with the first locking member. In reverse, as the table element is translated to the first transverse position, the cam follower again follows the angled cam surface in the opposite direction. This causes the second abutment member to move longitudinally (in a longitudinal direction of the support member), to the abutting position, and also cause the second locking member to move longitudinally to disengage from the first locking member.

Even more preferably, the cam surface is angled at approximately 45 degrees, for example between 30 degrees and 60 degrees.

Preferably, the table arrangement further comprises a second cam surface, adjacent the first cam surface, such that the cam follower can follow the second cam surface after following the first cam surface, and wherein the second cam surface urges the (first or) second abutment member (longitudinally) away from the abutting position. This prevents the second abutment member from returning to the longitudinal position of the abutting position and therefore prevents the second locking member from moving from the second engagement position (engaged) position to the first engagement position (disengaged) position.

Preferably, the second cam surface is transverse to the longitudinal axis of the support member, such that the cam follower follows the first and second cam surfaces as the table element moves between first and second transverse positions. Hence, the second abutment member is prevented from returning to the longitudinal position of the abutting position when the table element is being translated.

Preferably, the first abutment member (connected to the table element) is the first cam surface and the second abutment member (connected to the second locking member) is the cam follower. In other words, the (angled) cam surface is connected to the table element. For example, the cam surface may be located on an underside of the table element (for example, on the underside of the table surface).

Preferably, the (first or) second locking member is biased towards the first engagement (disengaged) position. This means that a user force (to overcome the bias) is required to move the second locking member into the second engagement (engaged) position (and allow the second abutment member to move to the non-abutting position and allow the table element to translate to the second transverse position). This also means that the table element is urged into the first transverse position (and the second abutment member is urged to the abutting position and the second locking member is urged into the first engagement (disengaged) position), at least when the cam follower is on the angled cam surface. The biasing may be provided by a spring.

Preferably, the second abutment member is connected to the second locking member by a locking rod, extending longitudinally through the support member. The biasing may be provided by biasing the locking rod in a first longitudinal position, in which the second locking member is in the first engagement position and the second abutment member is in the abutting position.

Preferably, the second locking member is rotatably mounted with respect to the second abutting member such that, as the support member is rotated, the second abutting member also rotates, but the second locking member may not. This ensures that the second locking member is able to align with the first locking member at a required orientation of the first locking member, whilst also allowing the second abutment member to rotate with the support member (and table element).

More preferably, the second locking member is prevented from rotating by the base structure. This could be done by at least part of the second locking member being located in a channel in the base structure.

Preferably, the support member is translatably mounted to the base structure, such that the support member can translate longitudinally between first and second longitudinal positions. The first longitudinal position may be a retracted position and the second longitudinal position may be an extended position. The support member may slide in relation to the base structure.

Here, "translate" means that the relevant element (e.g. support member) moves from a first position to a spatially different second position. Such motion could be achieved by sliding or by rotation about an (off-centre) axis or a combination.

More preferably, the support member is prevented from rotating between first and second rotation configurations when the support member is in at least one position other than the second longitudinal position.

Even more preferably, the support member is prevented from rotating when the support member is in any longitudinal position between the first and second longitudinal positions, other than the second longitudinal position. In other words, the support member may be prevented from rotating towards its second rotation (more deployed) configuration until the support member is fully extended to the second longitudinal (more deployed) position. This prevents the support member being rotated (which may cause, for example, the table element to be rotated) until the support member is extended, for example such that the, for example, table element is out of a housing. This prevents the table element, for example, from colliding with sides/surround of the housing.

Preferably, the support member is prevented from translating between first and second longitudinal positions when the support member is in at least one position other than the first rotation configuration.

More preferably, the support member is prevented from translating when the support member is in any rotation configuration between the first and second rotation configurations, other than the first rotation configuration. In other words, the support member may be prevented from translating towards its first longitudinal (more stowed/retracted) position until the support member is fully rotated to the first rotation (more stowed) configuration. This may prevent the table element, for example from colliding with sides/surround of the housing.

Preferably, the table arrangement further comprises a first slide element connected to the base structure, and a corresponding, second slide element connected to the support member, wherein, when the support member is in the first rotation configuration the second slide element aligns with the first slide element and is able to slide with respect to it. This means that the support member can (only) slide when it is in the first rotation configuration.

More preferably, the first slide element is a cam follower and the second slide element comprises a cam track, preferably with a longitudinal portion and/or a curved portion.

Even more preferably, the cam follower may follow the longitudinal portion in at least some positions between the first and second longitudinal positions of the support member (for example, between an intermediate position (between the first and second longitudinal positions) and the second longitudinal position) and may follow the curved portion in configurations between the first and second rotation configurations of the support member.

Alternatively, the first slide element may form a longitudinal channel within the base structure and the second slide element is a notch corresponding to the channel. Preferably, the notch is part of the first locking member. Preferably, the support member can only rotate when the notch is able to rotate out of the longitudinal channel into a transverse channel.

Alternatively, or additionally, the support member may be prevented from rotating (in at least some positions other than the second longitudinal position) by the table element being at least partially surrounded by a frame of the base structure. The table element may translate out of the frame, so it can rotate, when the support member is translated with respect to the base structure. The support member may be prevented from rotating by the frame of the base structure in positions from the first longitudinal position to an intermediate position (between the first longitudinal position and the second longitudinal position). Preferably, in between the intermediate position (between the first longitudinal position and the second longitudinal position) and the second longitudinal position, the support member may be prevented from rotating by the first and second slide elements.

Preferably, the table arrangement further comprises a mounting structure and wherein the base structure is translatably mounted to the mounting structure such that the base structure can translate between stowed and deployed positions. This may allow a telescopic movement arrangement with the mounting structure, base structure and support member. This allows the table element to be brought further out away from a housing (for example, provided by the mounting structure). The base structure may slide in relation to the mounting structure. The base structure may translate with respect to the mounting structure in a longitudinal direction of the support member.

Here, "translate" means that the relevant element (e.g. base structure) moves from a first position to a spatially different second position. Such motion could be achieved by sliding or by rotation about an (off-centre) axis or a combination.

The first slide element (connected to the base structure) may be part of, or connected to, the mounting structure (rather than being directly connected to the base structure). This allows the first slide element to prevent translation of the support member in relation to the mounting structure.

Preferably, the base structure and the support member are coupled together such that upon a user translating the support member away from the mounting structure, it is the base structure that translates in relation to the mounting structure (rather than the support member translating in relation to the base structure).

More preferably, the base structure and the support member are coupled by an attractive magnetic force.

Preferably, the base structure abuts against a stop of the mounting structure in the deployed position. Hence, a user, upon translating the support member away from the mounting structure, translates the base structure in relation to the mounting structure, then overcomes the coupling of the base structure and the support member and translates the support member in relation to the base structure.

According to a second aspect of the invention there is also provided a method of deploying or stowing the table element of the table arrangement described above.

According to a third aspect of the invention there is also provided an aircraft seat module or an aircraft comprising a table arrangement as described above. The table arrangement is mounted to the aircraft seat module or the aircraft for use by a passenger.

According to a fourth aspect of the invention there is also provided a method of deploying a table element of a table arrangement, the method comprising the following steps: rotating a support member of the table arrangement from a first rotation configuration to a second rotation configuration, thereby causing a first locking member to move to align with a second locking member, then moving the table element of the table arrangement transversely in relation to the support member, thereby causing the first or second locking member to move from a first engagement position to a second engagement position with respect to the other locking member.

Preferably, the first or second locking member in the second engagement position prevents the first locking member from moving to a non-aligned configuration with respect to the second locking member, and thereby prevents the support member from rotating from the second rotation configuration to the first rotation configuration.

Preferably, the first locking member in the aligned position allows the first or second locking member to move into the second engagement position.

Preferably, when the first locking member is in the aligned position, a second abutment member is able to move to a non-abutting position in relation to a first abutment member (and allow the table element to translate), (and move the first or second locking member towards the second engagement position).

Preferably, the method further comprises the step of translating the support member in relation to a base structure of the table arrangement prior to rotating the support member and more preferably, prior to translating the support member in relation to the base structure.

Preferably, the method further comprises the step of translating the base structure in relation to a mounting structure of the table arrangement prior to rotating the support member.

According to a fifth aspect of the invention there is also provided a method of stowing a table element of a table arrangement, the method comprising the following steps: moving the table element of the table arrangement transversely in relation to a support member of the table arrangement, thereby causing a first or second locking member to move from a second engagement position to a first engagement position with respect to other locking member, then rotating the support member from a second rotation configuration to a first rotation configuration, thereby causing the first locking member to move to a non-aligned configuration with respect to the second locking member.

Preferably, the first or second locking member in the first engagement position allows the first locking member to move to the non-aligned configuration with respect to the second locking member, and thereby allows the support member to rotate from the second rotation configuration to the first rotation configuration.

Preferably, the first locking member in the non-aligned configuration prevents the first or second locking member moving to the second engagement position.

Preferably, the first or second locking member is able to move from the second engagement position towards the first engagement position when a second abutment member is in an abutting position in relation to a first abutment member (and not allowing the tale element to translate).

Preferably, the method further comprises the step of translating the support member in relation to a base structure of the table arrangement after rotating the support member.

Preferably, the method further comprises the step of translating the base structure in relation to a mounting structure of the table arrangement after rotating the support member and more preferably after translating the support member in relation to the base structure.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION

Figure 1A:
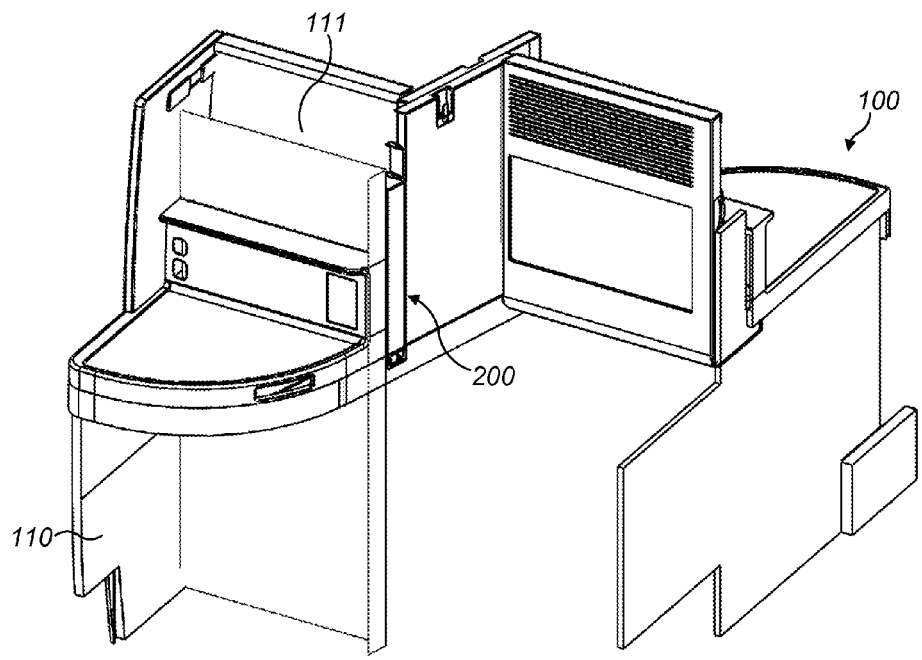
FIG. 1a shows a perspective view of an aircraft seat module, including a table arrangement according to a first embodiment of the invention, in a stowed configuration.

FIG. 1a shows a perspective view of an aircraft seat module 100, including a table arrangement 200 according to a first embodiment of the invention, in a stowed configuration. Here, the table arrangement 200 is stowed within a table housing 111 of a console 110 of the module 100.

Figure 1B:
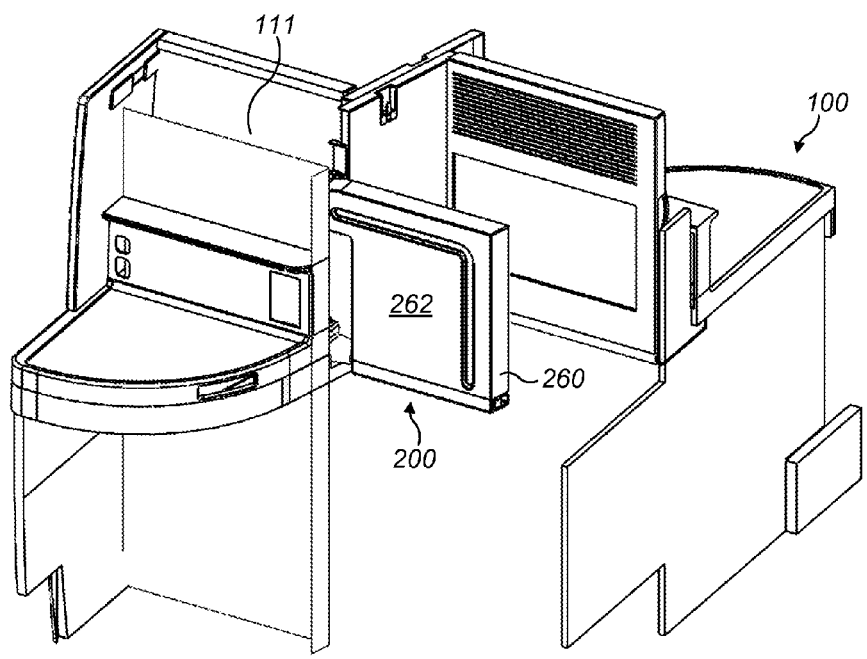
FIG. 1b shows a perspective view of the aircraft seat module of FIG. 1a, with the table arrangement in a partially deployed configuration.

FIG. 1b shows a perspective view of the aircraft seat module 100 of FIG. 1a, with the table arrangement 200 in a partially deployed configuration. Here, a table structure 260 of the table arrangement 200 has been partially slid out from the housing 111.

Various elements of the table arrangement 200 will now be described. These different elements allow the table structure 260 of the table arrangement 200 to be partially slid out of the housing 111 (as in FIG. 1b), then fully slid out of the housing 111, then rotated to horizontal (as in FIG. 11a) and then translated forwards (as in FIG. 11b). Importantly, the interaction of the different elements of the table arrangement 200 provides that these different motions cannot occur at the same time.

Figure 2:
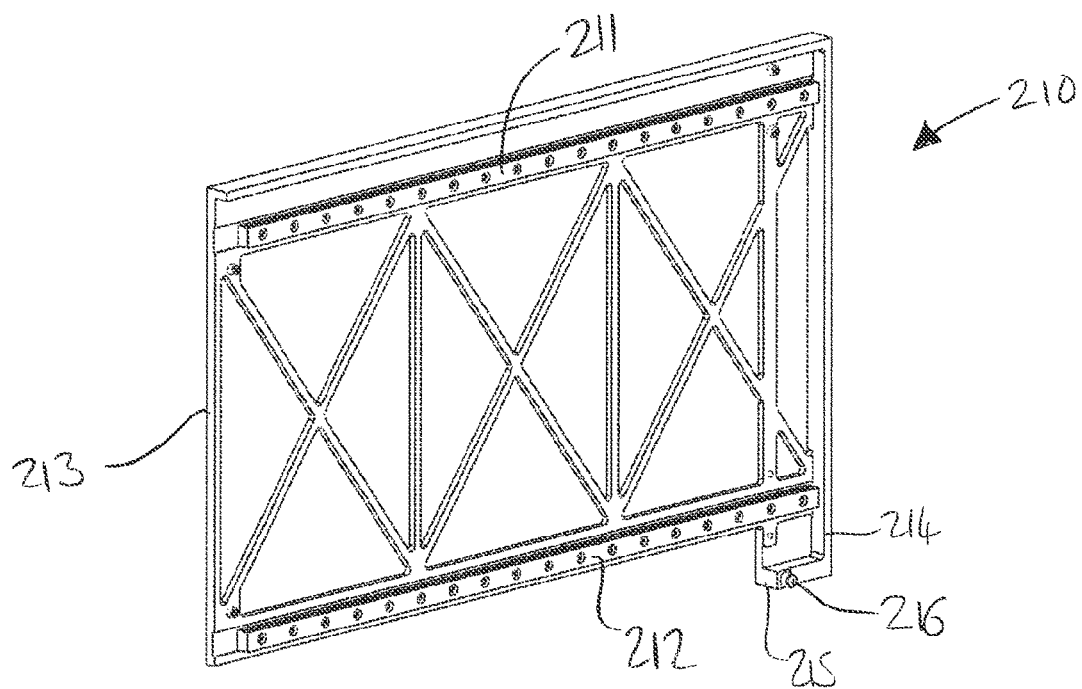
FIG. 2 shows a perspective view of a mounting structure of the table arrangement.

FIG. 2 shows a perspective view of a mounting structure 210 of the table arrangement 200. The mounting structure 210 is mounted inside the housing 111, to a wall of the console 110, using screws. The mounting structure 210 cannot be seen in FIGS. 1a and 1b. The mounting structure 210 comprises a flat rectangular frame 213, with an upper rail 211 running along a top long side and a lower rail 212 running along a bottom long side. As it is shown in FIG. 2, the left hand side end of the mounting structure 210 is mounted furthest into the housing 111 and the right hand side end is mounted near the right hand open side of the housing 111. At the right hand side end of the mounting structure 210 is a downwardly protruding portion 214, which also extends outwardly 215 (away from the flat frame 213) at its distal end. On the outwardly extending portion 215 is a cylindrical cam follower 216. This cam follower 216 interacts with a cam track 235 of a supporting structure 230, as will be described later.

Figure 3A:
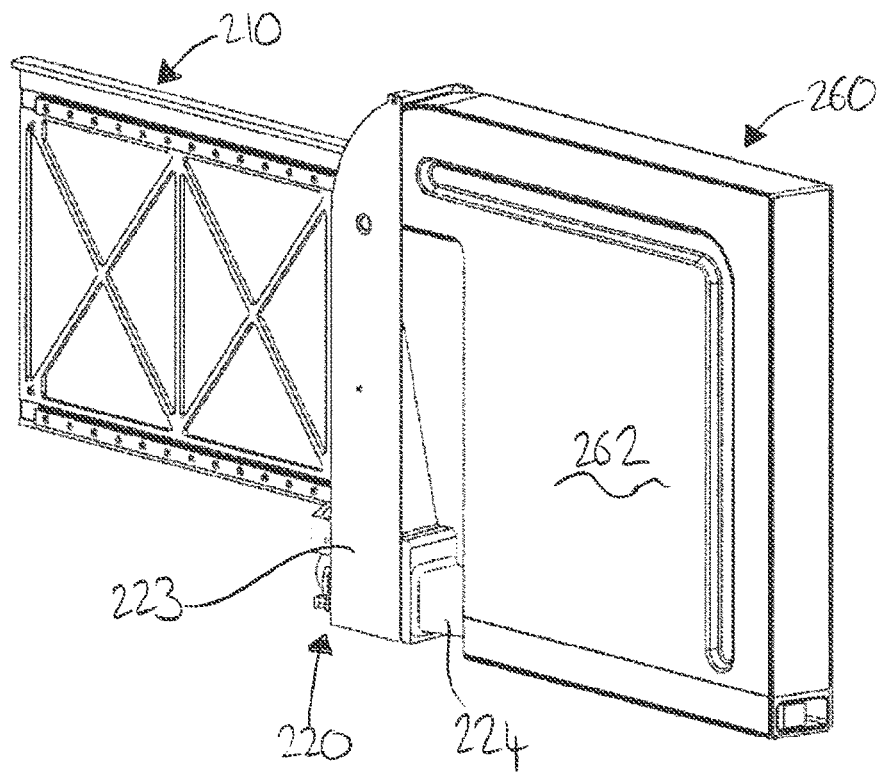
FIG. 3a shows a perspective view of the mounting structure, a base structure and a table structure of the table arrangement, with the table arrangement in the partially deployed configuration.

FIG. 3a shows a perspective view of the mounting structure 210, a base structure 220 and the table structure 260, with the table arrangement 200 in the partially deployed configuration. This Figure shows the table structure 260, with its underside 262 showing, partially slid out from the housing 111 (as in FIG. 1b). Here, the base structure 220 can be seen. This base structure 220 is mounted to the mounting structure 210 by an upper runner (221, but not visible) and a lower runner (222, but not visible), corresponding to the upper and lower rails 211, 212 of the mounting structure 210. The base structure 220 also comprises a vertical containment frame 223. This containment frame 223 contains a left hand end of the vertical table structure 260 and prevents it from rotating towards a horizontal position while the table structure 260 is stowed and partially deployed. The base structure 220 also comprises an elongate support rod holder 224, extending from the containment frame 223 out of the housing 111.

To move the table structure 260 from the stowed position to the partially deployed position, the base structure 220 moves on the rails 211, 212 of the mounting structure 210 until it hits a first stop (not shown).

Figure 3B:
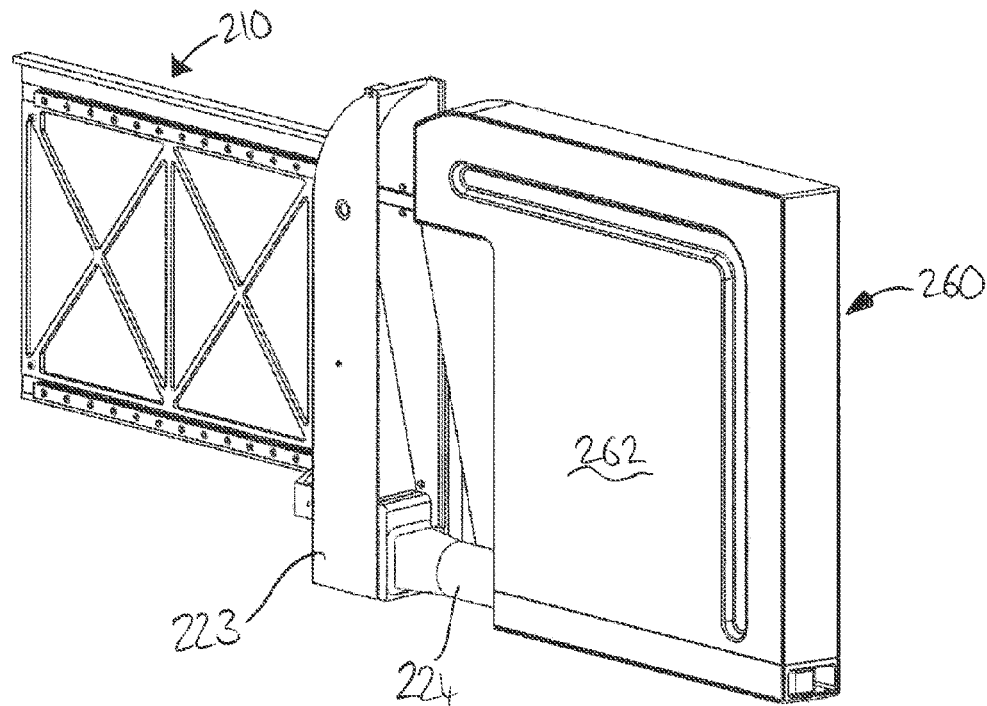
FIG. 3b shows a perspective view of the mounting structure, the base structure and the table structure, with the table arrangement in a further deployed configuration.
Figure 3C:
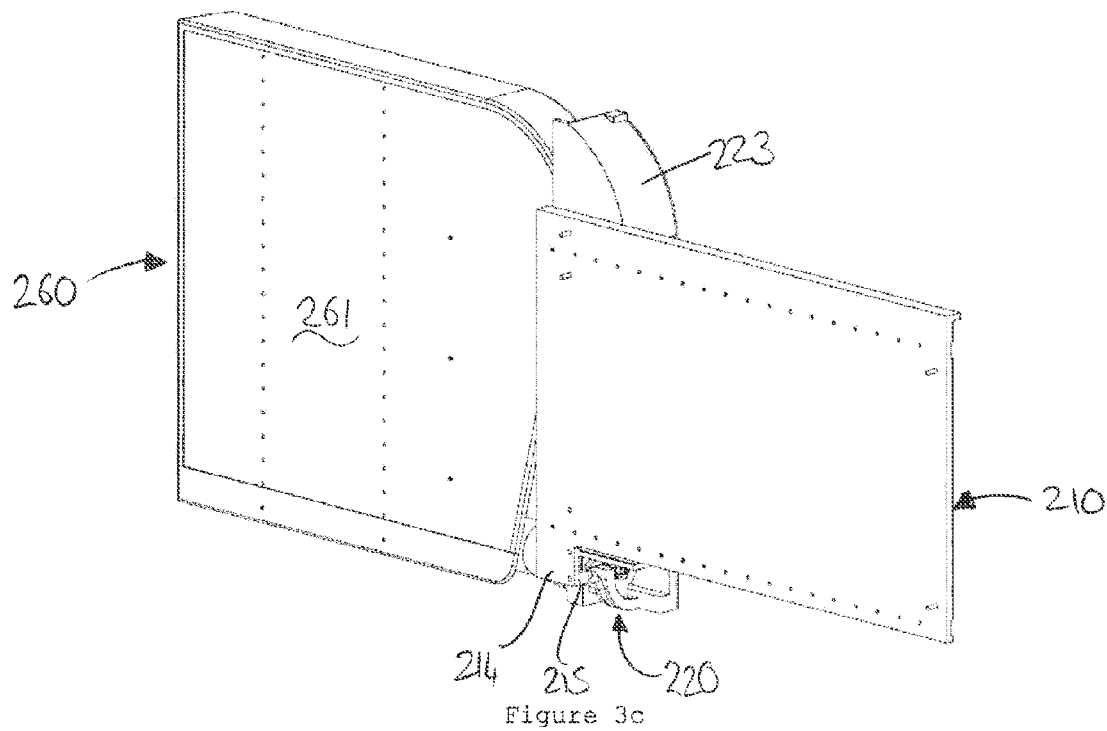
FIG. 3c shows a reverse perspective view of the mounting structure, the base structure and the table structure, with the table arrangement in the further deployed configuration.

FIGS. 3b and 3c show perspective views of the mounting structure 210, the base structure 220 and the table structure 260, with the table arrangement in a further deployed configuration. FIG. 3c is a reverse view, with the upper table surface 261 of the table structure 260 visible. In both Figures, the table structure 260 has been further pulled out away from the housing 111 so that the table structure 260 is clear of the containment frame 223. To do so, the table structure 260 has been pulled away from the base structure 220.

This has been done by pulling a support rod 231 (to which the table structure 260 is mounted, and which will be described in more detail later) of a support structure 230 out of the elongate support rod holder 224 of the base structure 220. The support rod 231 can be pulled out of the support rod holder 224 until it meets a second stop (not shown here).

During the first stage of deployment (when the base structure 220 moves in relation to the mounting structure 210), the support structure 230 is prevented from moving in relation to the base structure 220 by a pair of magnets. One of the magnets is attached inside the top of the containment frame 223 and the other magnet is attached inside the corresponding top left corner of the table structure 260, as it is shown in FIGS. 3a and 3b. Once the table arrangement is in the partially deployed position and the first stop has been reached, further pulling on the table structure 260 overcomes the force from the magnets to allow the support rod 231 to move in relation to the rod holder 224.

There is also a second pair of magnets; with a first magnet attached to the mounting structure 210 and a second magnet attached to the base structure 220, to prevent them moving in relation to each other. Hence, during a first stage of stowage, the table structure 260 (and support structure 230) slide in relation to the base structure 220 and then, once the table structure 260 abuts against the containment frame 223, the base structure 220 is pushed to overcome the attractive magnetic force of the second magnetic coupling, and the base structure 220 is slid in relation to the mounting structure 210.

Figure 4:
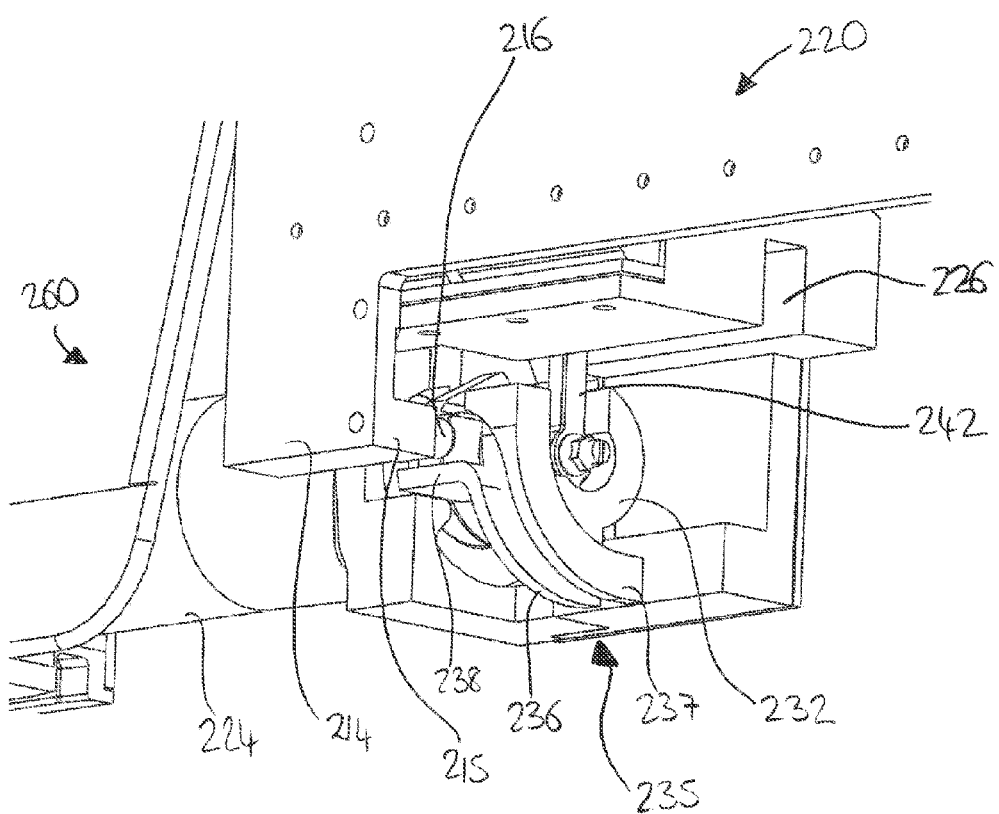
FIG. 4 shows an enlarged perspective view showing a supporting structure of the table arrangement, in the further deployed configuration.

FIG. 4 shows an enlarged perspective view showing a part of the supporting structure 230 of the table arrangement 260, almost in the further deployed configuration. This part of the support structure 230 comprises a locking wheel 232 (which is fixedly mounted to the end of the support rod 231).

Figure 10A:
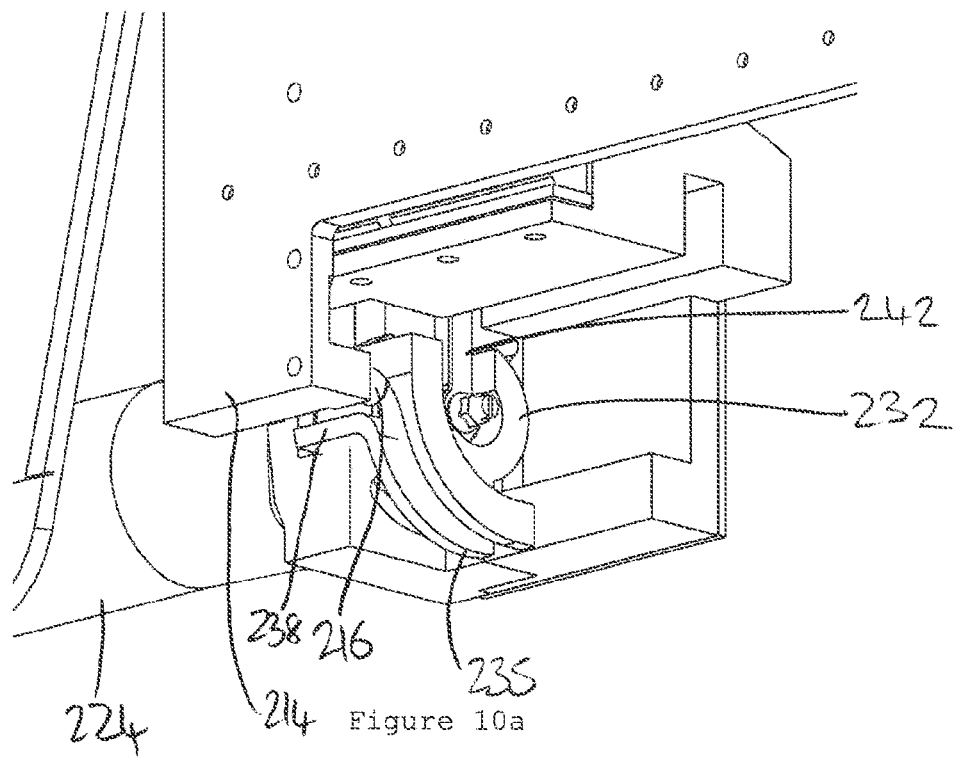
FIG. 10a shows an enlarged perspective view showing the mounting structure and supporting structure of the table arrangement, in the further deployed configuration.
Figure 10B:
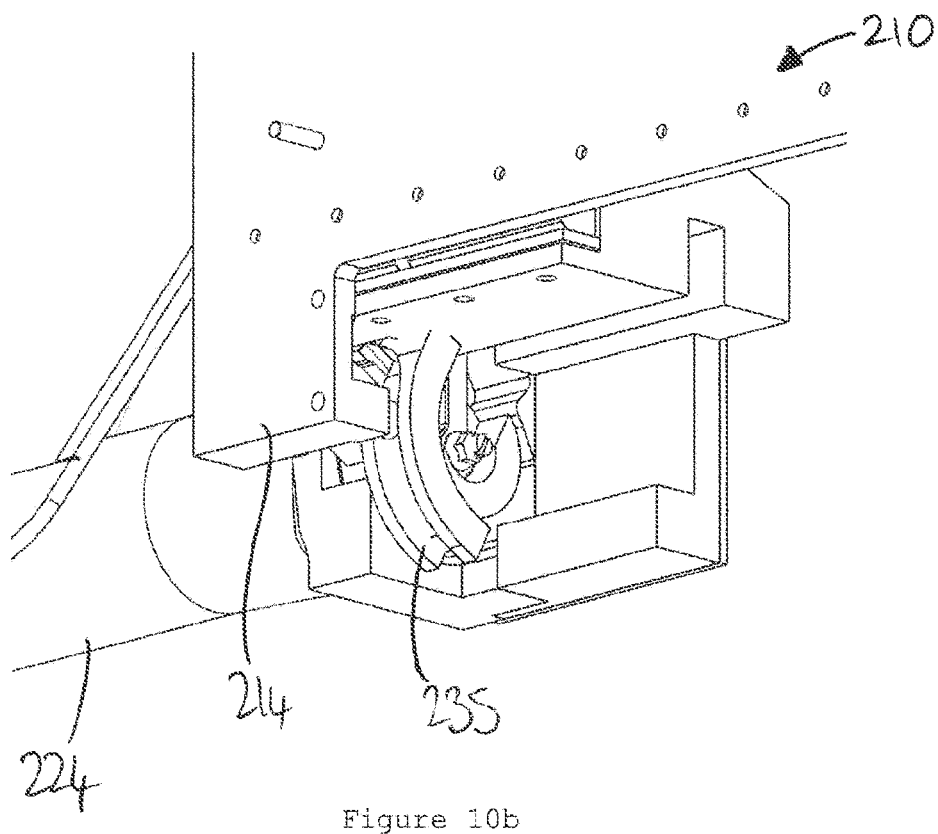
FIG. 10b shows an enlarged perspective view showing the mounting structure and supporting structure of the table arrangement, in a partially rotated configuration.
Figure 10C:
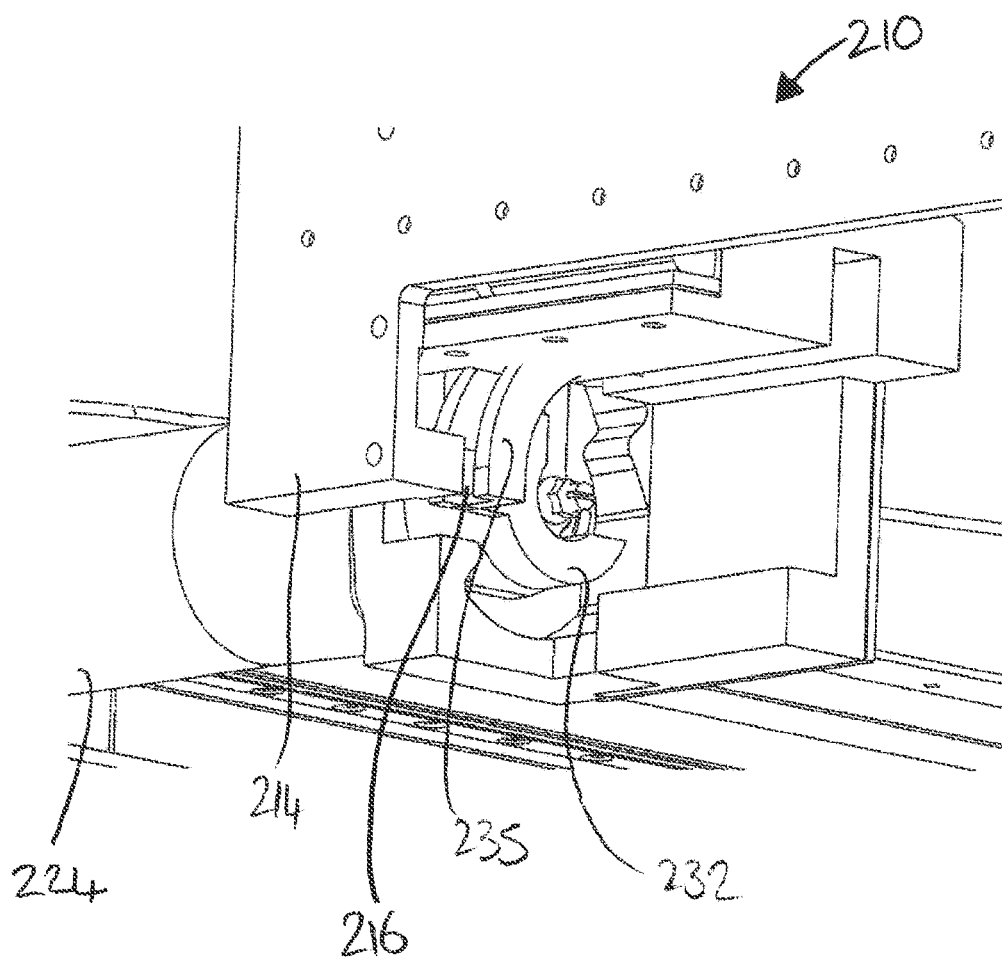
FIG. 10c shows an enlarged perspective view showing the mounting structure and supporting structure of the table arrangement, in the fully rotated configuration.

In FIG. 4, it can be seen that the locking wheel 232 has a cam track 235 on part of the outside circumference of the wheel 232. This cam track is made up of an outer wall 236 and an inner wall 237. These walls are parallel to each other (to define the cam track 235 in between them) and extend around a quarter of the circumference of the wheel 232. At an upper end of the walls 236, 237 (as they are shown in FIG. 4), the walls curve to extend the cam track 235 longitudinally outwards 238, at 90 degrees to the circumferential path of the cam track 235. The cam track 235 is a width to correspond to the cam follower 216 of the mounting structure and this cam follower 216 sits inside the longitudinal portion 238 of the cam track 235, when the table structure 260 is being deployed almost to the further deployed position (where the table structure 260 is not being contained by the containment frame 223 of the base structure 220), as shown in FIG. 4. As the support rod 231 is further pulled out of rod holder 224 to the fully pulled out position (further deployed position, as shown in FIG. 10a), the cam track 235 moves forwards so that the cam follower 216 then sits at the curved corner between the circumferential portion and the longitudinal portion—i.e. at the top of the circumferential portion of the cam track 235. This then means that the cam track 235 (and therefore the locking wheel 232 and support rod 231) are urged to rotate clockwise "around" (over) the cam follower 216 to a rotated position. FIG. 10b shows the locking wheel 232 starting this rotation motion (partially rotated position). FIG. 10c shows the fully rotated (90 degrees) configuration. This rotation is allowed by the support rod 231 being rotatably mounted in the rod holder 224. The rotation is prevented from going further than the 90 degrees position, as will be described later. When rotating anti-clockwise from the rotated position to the "non-rotated" position, the rotation is prevented from going further than the 0 degrees position by the longitudinal portion 238 of the inner cam wall 237 abutting against the cam follower 216.

Figure 5A:
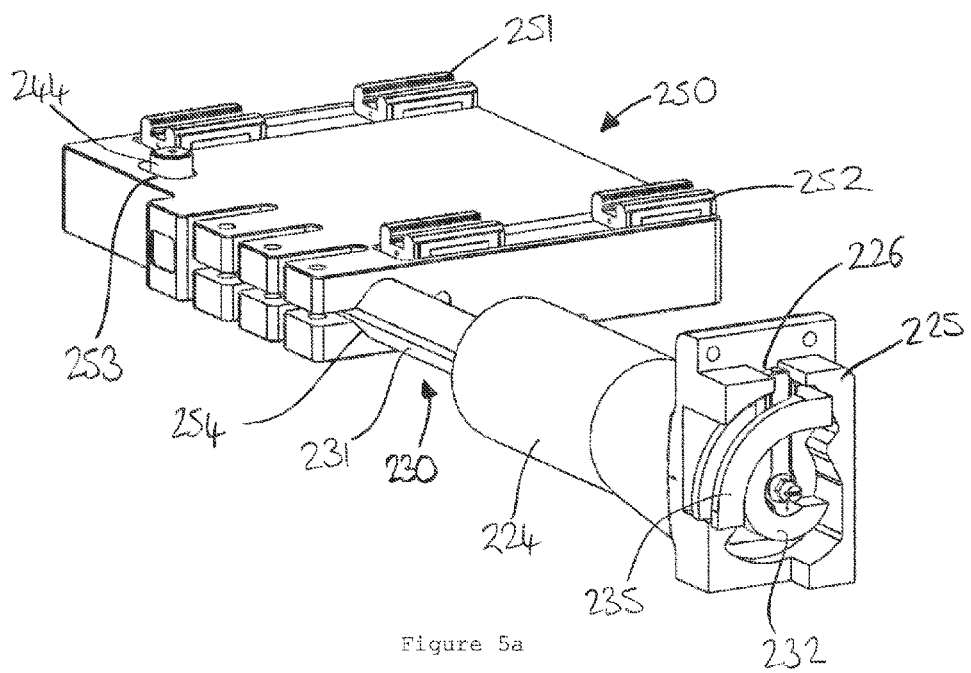
FIG. 5a shows a perspective view of a table slide structure, a supporting structure, and part of the base structure of the table arrangement, in a rotated configuration.
Figure 5B:
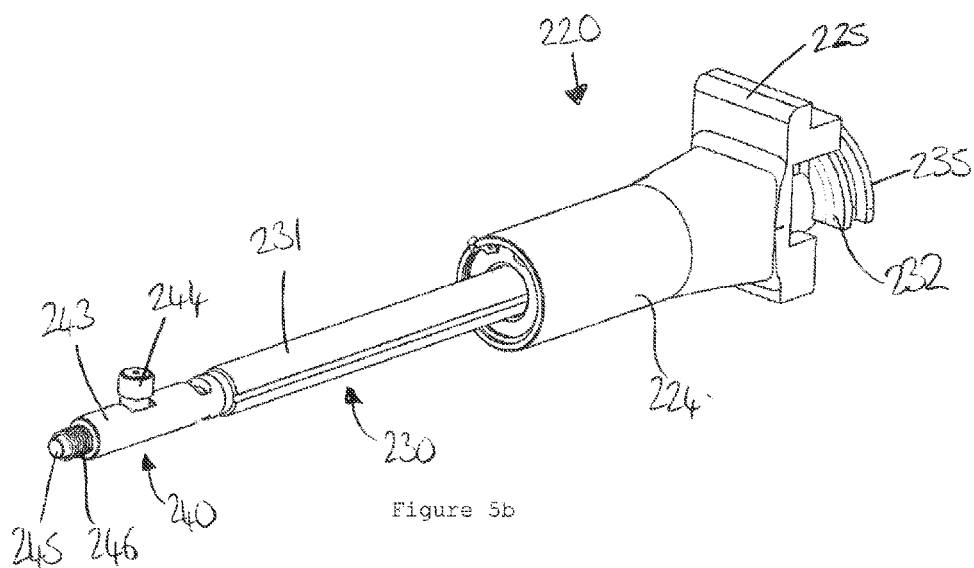
FIG. 5b shows a perspective view of the supporting structure, a locking structure and part of the base structure of the table arrangement, in the rotated configuration.
Figure 5C:
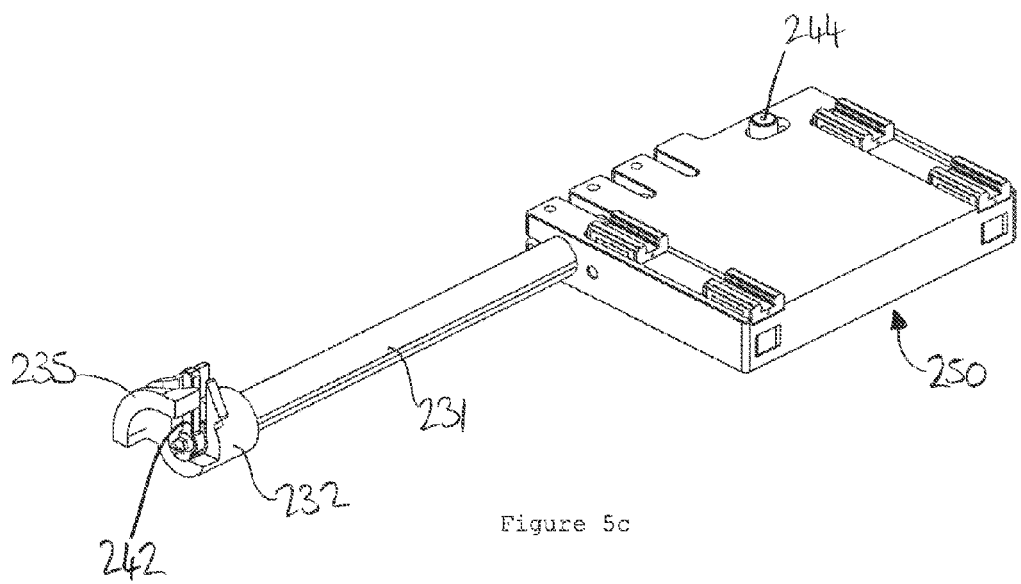
FIG. 5c shows a reverse perspective view of the supporting structure, the locking structure and the table slide structure, in the rotated configuration.
Figure 7A:
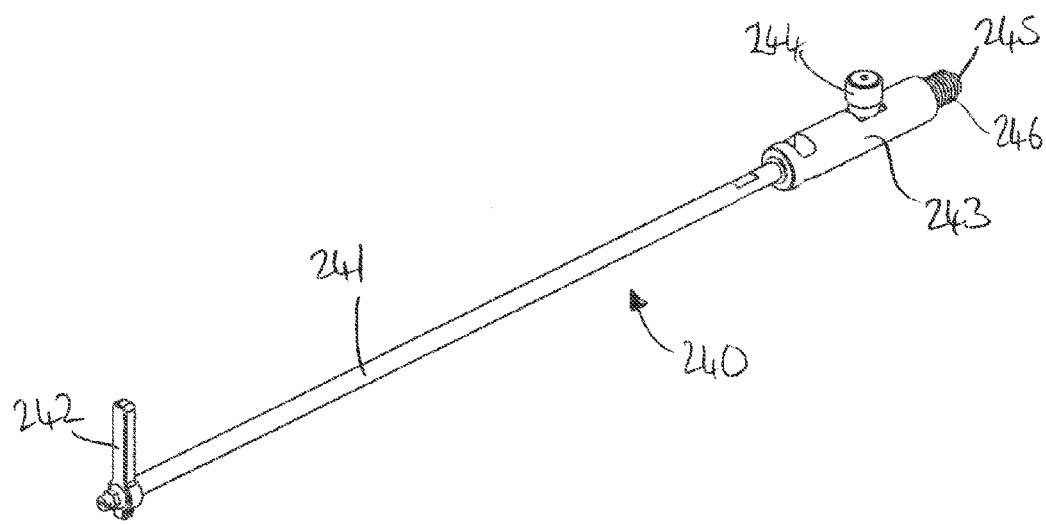
FIG. 7a shows a perspective view of the locking structure.
Figure 7B:
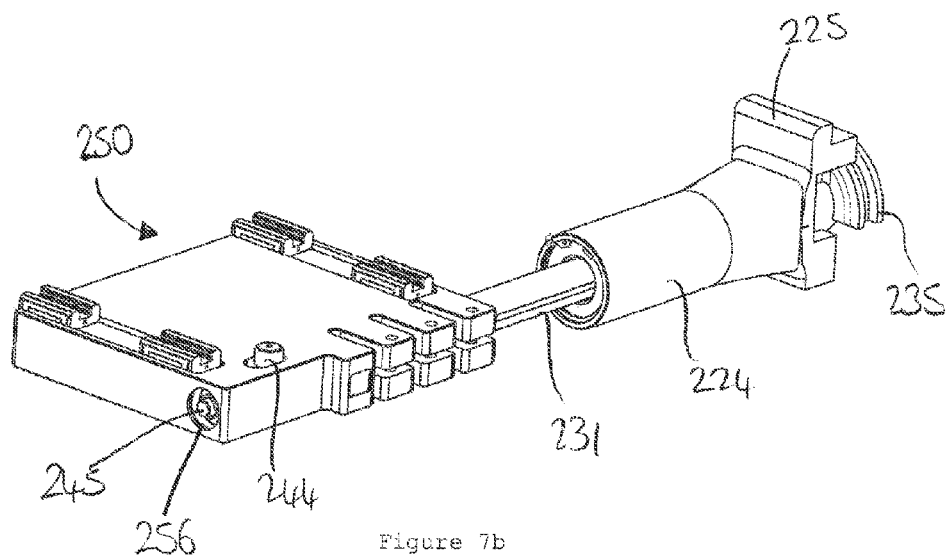
FIG. 7b shows a reverse perspective view of the table slide structure, supporting structure, and part of the base structure of the table arrangement, in the rotated configuration.

FIGS. 5a, 5c and 7b shows perspective views of a table slide structure 250, the supporting structure 230, and part of the base structure 220 of the table arrangement 200, in the rotated (90 degrees) configuration. Here, the locking wheel 232 (and cam track 235 and support rod 231) have all rotated 90 degrees clockwise. Here it can be seen that the base structure 220 comprises a frame 225 portion through which the support rod 231 extends so that the locking wheel 232 is located on an inside side of the frame 225. It is the locking wheel abutting against an inside portion of the frame 225 that prevents the support rod 231 extending further away from the base structure 220 (the second stop of the second sliding motion). The frame comprises a locking pin slot 226 to hold a locking pin 242 of a locking structure 240 (as will be described later) in a vertical position.

At an opposite end of the support rod 231 (to the base structure 220), a table slide structure 250 is mounted to the support rod 231, so as to be rotationally fixed in relation to it. The table slide structure 250 comprises a horizontal (when the support rod 231 has been rotated to the rotated (90 degrees) position), flat rectangular member that extends horizontally away from the axis of the support rod 231. The slide structure 250 has an elongate cylindrical channel 254 for accommodating the far end of the support rod 231. The slide structure 250 has two pairs of runners 251, 252 mounted to the upper surface to provide two movement lines, one at the far end of the table slide structure 250 and one at the near end of the table slide structure 250. These runners 251, 252 accommodate rails 263, 264 on an underside of an upper table surface 261 of the table structure 260, as will be described later.

The table slide structure 250 also comprises an oval hole 253, in line with the elongate channel 254 and support rod 231, and on the upper surface, towards a far end of the slide structure 250, for accommodating a cam follower 244 of the locking structure, as will be described later. Here, the cam follower 244 is accommodated in a near side of the oval hole 253.

FIG. 7b is a reverse perspective view and shows the far end of the table slide structure 250. Here a hole 256 is provided for allowing a far end of the locking structure 240 to protrude, as will be described later.

FIG. 5b shows a perspective view of the supporting structure 230, the locking structure 240 and part of the base structure 220 of the table arrangement 200, in the rotated configuration. Here, as in FIGS. 5a and 5c, it can be seen that the locking wheel 232 has been rotated to the rotated position in the frame 225. The support rod 231 has also been rotated (as it is rotationally locked with the locking wheel 232), within the rod holder 224. FIG. 5b shows part of the locking structure 240 at a far end of the support structure 230. This will be described in more detail in relation to FIG. 7a.

Figure 6A:
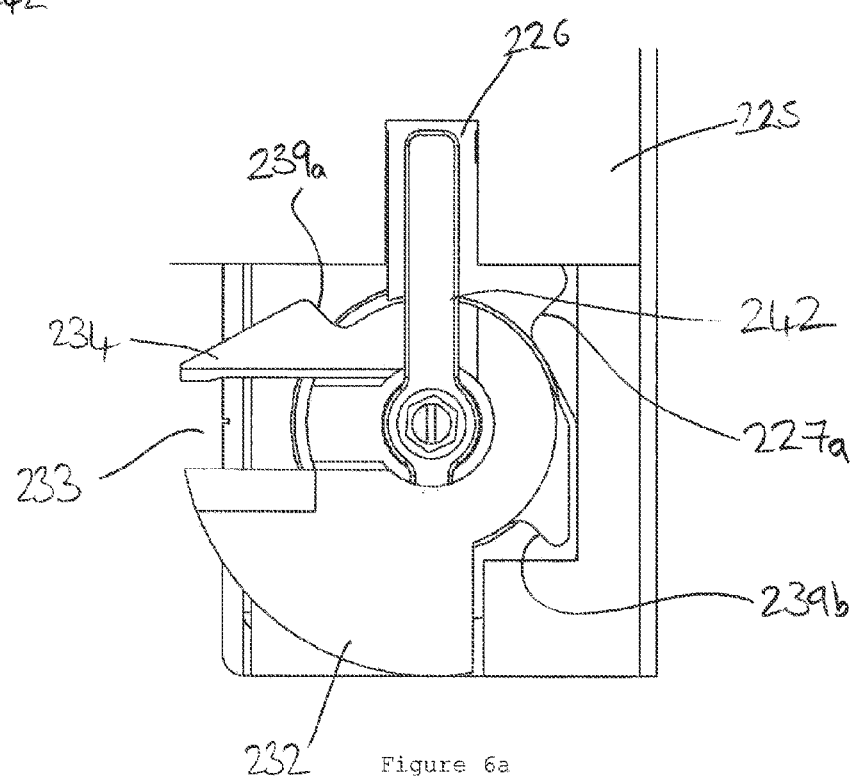
FIG. 6a shows an end view of the base structure, locking structure and supporting structure in the non-rotated position.
Figure 6B:
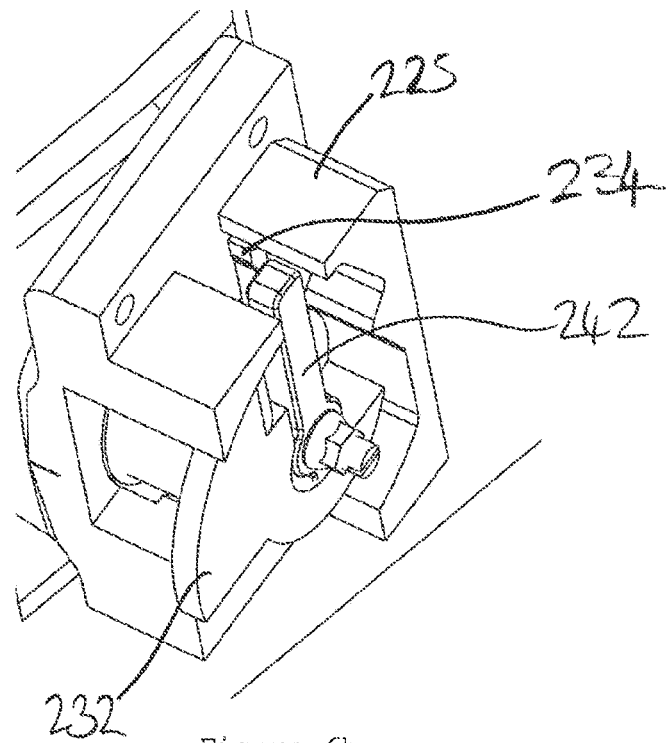
FIG. 6b shows a perspective view of the base structure, locking structure and supporting structure in the rotated position.

Looking at FIG. 6a, which shows an end view of the base structure 220, locking structure 240 and supporting structure 230 in the non-rotated position, more features of the locking wheel 232 can be seen. The locking wheel 232 has a prong 234 on the clockwise side of a locking pin slot 233 of the locking wheel 232. This prong 234 sits behind the locking pin 242 with the locking wheel 232 is in the "non-rotated" position of FIG. 6a. It can do so because it is thinner than the rest of the locking wheel 232, as can be seen in FIG. 6b. This prevents the locking pin 242 moving backwards (as viewed in FIG. 6a) when the locking wheel is in this "non-rotated" position.

The clockwise face of the prong 234 has a contoured surface 239a which abuts against a corresponding contoured face 227a of the locking frame 225 when the locking wheel 232 is in the rotated (90 degrees position. This abutting prevents the locking wheel 232 from rotating further than this 90 degrees position. There is also a further contoured surface 239b approximately 180 degrees around the locking wheel 232. At the same 90 degrees position, this surface abuts against a corresponding contoured surface 227b (not shown) of the locking frame 225.

Figure 6C:
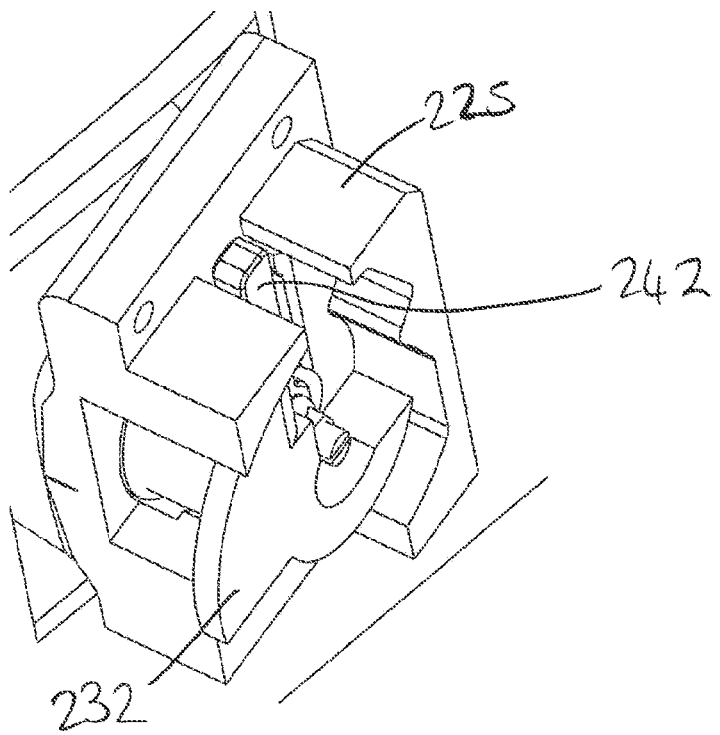
FIG. 6c shows a perspective view of the base structure, locking structure and supporting structure in the rotated position, with the locking structure in an engaged position.

FIG. 6b shows a perspective view of the base structure 220, locking structure 240 and supporting structure 230 in the rotated (90 degrees) position. Here, the locking wheel 232 has been rotated clockwise (until contoured surface 239a of the wheel 232 has abutted against corresponding contoured surface 227a of the frame 225). Here, it can be seen that the locking pin slot 233 then lines up with the locking pin 242 of the locking structure 240 and allows the locking pin 242 to be moved outwards (into the page, as viewed in FIG. 6b) from the disengaged position of FIG. 6b to the engaged position of FIG. 6c.

FIG. 7a shows a perspective view of the locking structure 240, which will now be described in more detail. The locking structure 240 comprises an elongate locking rod 241 which is mounted within the support rod 231. At a near end is fixedly mounted the locking pin 242 that sits in the frame of the base structure 225. As previously discussed, the locking pin 242 is fixed in a vertical orientation by the slot 226 in the frame 225 and so the locking rod 241 is also held in a fixed orientation. Towards the far end of the locking rod 241 is a sleeve 243 mounted on the locking rod 241. The sleeve 243 is rotatably mounted on the rod 241 so can rotate in relation to it. Mounted on the sleeve 243 is the cam follower 244 mentioned earlier. At the very far end of the locking rod 241, on the portion of the locking rod 245 protruding from the far end of the sleeve 243 is a bias spring 246. This bias spring 246 abuts against a third stop (not shown) adjacent the hole 256 in the table slide structure 250. When the locking rod 241 is pushed towards to protrude into the hole 256 in the table slide structure 250, the spring 246 is caused to compress (by the far side of the sleeve 243 pushing on it and compressing it against the third stop).

Figure 8:
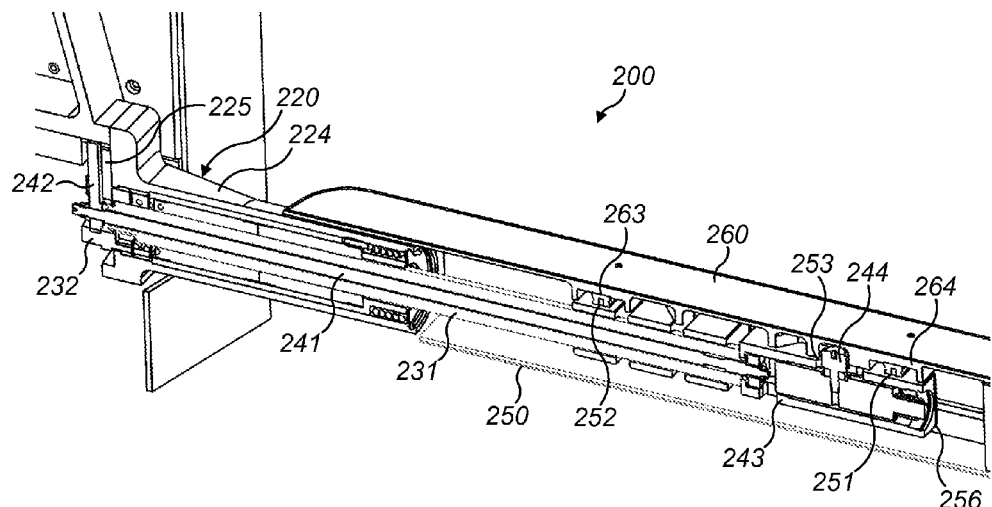
FIG. 8 shows a sectional view of the base structure, supporting structure, locking structure, table slide structure and table structure.

FIG. 8 shows a sectional view of the base structure 220, supporting structure 230, locking structure 240, table slide structure 250 and table structure 260. At the near end, the locking pin 242 is held vertically by the frame 225. It is connected to the locking rod 241 that runs through the support rod 231. On the far portion of the locking rod 241 (that protrudes from the support rod 231) the sleeve 243 is mounted.

Figure 9:
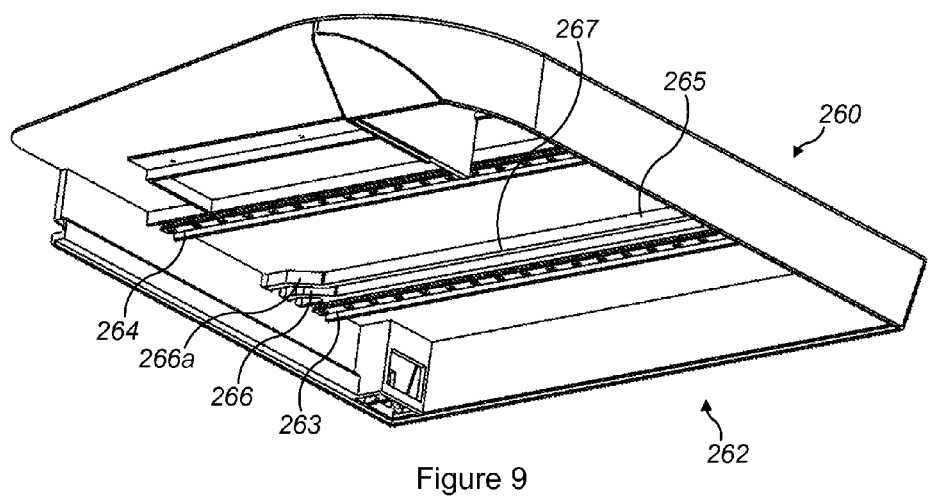
FIG. 9 shows a cut-away underside view of the table structure.

The cam follower 244 of the sleeve 243 can also be seen protruding upwards through the oval hole 253 in the table slide structure so as to be adjacent the underside of the table upper surface 261 of the table structure 260. The table structure 260 is mounted by rails 263, 264 in runners 251, 252. The rails 263, 264 are located on the underside of the table upper surface 261 and can be seen in FIG. 9, which shows a cut-away underside view of the table structure 260, with the underside 262 removed.

On the underside of the table upper surface 261 of the table structure 260, there is also a cam track 265 running across the width of the table structure 260 (i.e. transverse to the support rod 231 when mounted on the table slide structure 250). The cam track 265 comprises an elongate portion 267, running across most of the width, with an angled portion 266 located at one end. The angled portion 266 is at a 45 degree angle to the width and length of the table structure 260 (i.e. it is at a 45 degree angle to the longitudinal axis of the support rod 231 and the transverse travel direction of the table structure 260).

The cam follower 244 sits in this angled portion 266 of the cam track 265. However, when in this fully rotated position, the locking pin 242 lines up with the locking slot 233. Hence, when a user pushes on the table structure 260 in a transverse direction (i.e. into the page, as shown in FIG. 8), a near wall 266a of the angled cam track urges the cam follower 244 into the longitudinal portion 267 of the cam track 265 so that the table structure 260 can slide transversely on the runners 251, 252. In urging the cam follower 244 into the longitudinal portion, the cam follower 244 is forced to move slightly toward the far end (to the far end of oval hole 253). This causes the locking rod 241 and locking pin 242 to also shift in this far direction. This causes the locking pin 242 to move from the disengaged position of FIG. 6b to the engaged position of FIG. 6c. As the locking pin 242 is then adjacent and lateral to the prong 234, this prevents the locking wheel 232 from rotating back to the "non-rotated" position. This is needed, as otherwise, when the table structure 260 is translated transversely to the support rod 231, its centre of gravity would move from being on the near side of the rotational axis of the support rod 231 to being on the far side of it (as it is shown in FIG. 8), the support rod 231 would be caused to rotate back towards the "non-rotated" position.

Figure 11A:
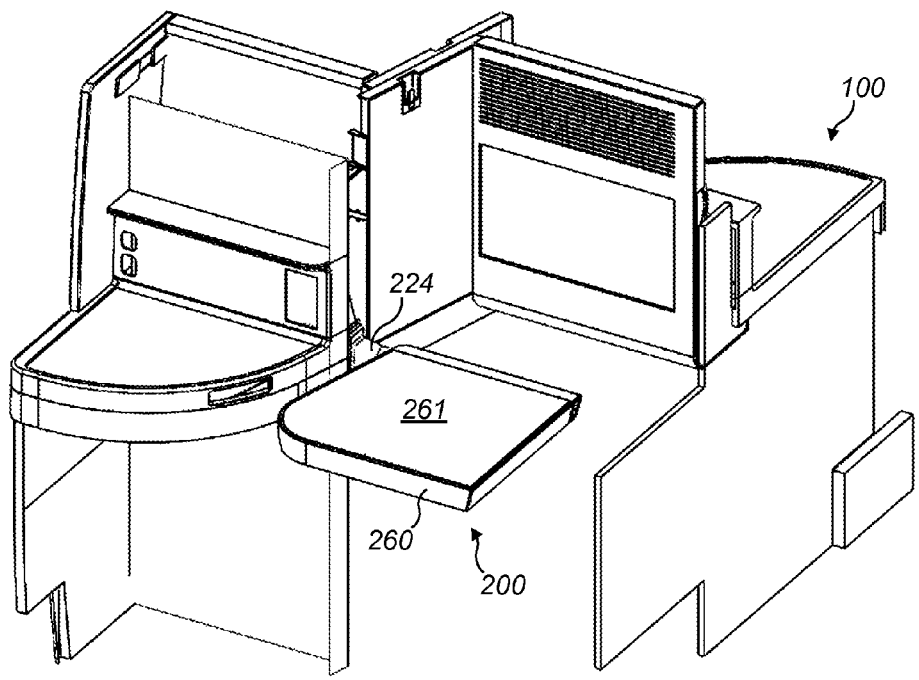
FIG. 11a shows a perspective view of the aircraft seat module, with the table arrangement in the rotated configuration.
Figure 11B:
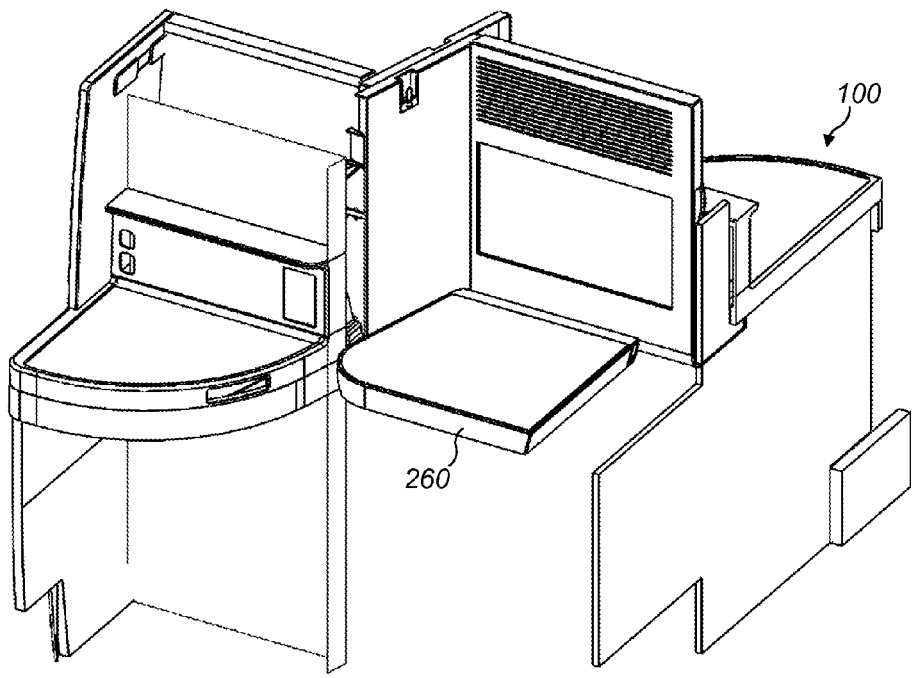
FIG. 11b shows a perspective view of the aircraft seat module, with the table arrangement in a rotated and translated configuration.

FIG. 11a shows a perspective view of the aircraft seat module 100, with the table arrangement 200 in the rotated configuration. Here, the table structure 260 has been rotated downwards so that the upper table surface 261 is uppermost and horizontal. FIG. 11b shows a perspective view of the aircraft seat module 100, with the table arrangement 200 in a rotated and translated configuration. Here, the table structure 260 has then been pushed forwards (into the page, as shown in FIG. 11b) to a translated position. This gives a passenger (user) more room to egress from the seat.

In use, as previously noted, the table structure 260 of the table arrangement 200 is moved from a fully stowed position (located vertically in the housing 111—FIG. 1a), to a partially deployed position (where it is partially slid out of the housing 111—FIG. 1b), then to a further deployed position (fully slid out of the housing 111—FIG. 3b), then rotated to a rotated (horizontal—see FIG. 11a) position and then, a fully deployed (translated—see FIG. 11b) position.

Firstly, when the table structure 260 is moved from the fully stowed position to the partially deployed position: The table structure 260 is pulled out by a user. The base structure 220 is moved outwards, on the rails 211, 212 of the mounting structure 210 until the base structure 220 reaches a stop (not shown) on the mounting structure 210. During this motion, the supporting rod 231 is prevented from moving in relation to the base structure 220 by the magnet (not shown). Also, during this motion, the table structure 260 is prevented from rotating by being contained in the containment frame 223 of the base structure 220.

Secondly, when the table structure 260 is moved from the partially deployed position to the further deployed position: The user overcomes the magnetic force to slide the support rod 231 out of the rod holder 224 of the base structure 220. Further sliding causes the table structure 260 to move out of containment from the containment frame 223. However, it is then prevented from rotating by the cam follower 216 of the mounting structure 210 engaging in the longitudinal portion 238 of the cam track 235. Further sliding of the support rod 231 in the holder 224 moves the cam track 235 forwards so that the cam follower 216 is engaged at the top of the circumferential portion when the table structure 260 is in the fully slid out (further deployed position).

Thirdly, when the table structure 260 is moved from the further deployed position to a rotated horizontal position: The cam track 235 is then able to rotate "around (over) the cam follower 216 when the user rotates the table structure 260 (and therefore also the support rod 231 and locking wheel 232) clockwise until the pairs of contoured surfaces 239, 227a and 239b, 227b abut. During this motion, the table structure 260 is prevented from sliding back in relation to the mounting structure 210 or base structure 220, by the cam track 235 not being able to slide longitudinally in relation to the cam follower 216. Also, during this motion (and before), the table structure 260 is prevented from translating, due to the cam follower 244 not being able to move past the angled cam surface 266 wall 266a, because of the locking pin 242 not being able to move into the locking pin slot 233.

Finally, when the table structure 260 is moved from the rotated horizontal position to the fully deployed translated position: A user pushes the table structure 260 in the transverse direction, causing the cam follower 244 to follow the angled cam track 266. This shifts the cam follower 244 towards the far end (of oval hole 253) which causes (through the locking rod 241) the locking pin 242 to move into the engaged position with the locking wheel 232, against the bias of the spring 246. This then prevents the locking wheel 232 from rotating and so prevents the table structure 260 from rotating back. Once the cam follower 244 is on the elongate cam track 267, the table structure 260 can simply slide on runners and rails 251, 252, 263, 264 to the fully deployed, translated position.

To stow the table structure 260, the reverse occurs:

The table structure 260 is translated back so that the cam follower 244 reaches the angled cam surface. The bias spring 246 then causes the locking rod 241 to return to its former (near) position (and the locking pin 242 to return to the disengaged position and the cam follower 244 to return to the near side of oval hole 253), The locking wheel 232 is then able to rotate and so the user can rotate the table structure 260 back up to vertical, when the cam follower 216 abuts against the longitudinal portion 238 of the inner cam wall 237. Here, the cam track 235 rotates "around" (over) cam follower 216, The table structure 260 can then be slid back into the housing 111 (as the cam follower 216 of the mounting structure is now in the longitudinal portion 238 of the cam track 235) firstly by the support rod 231 sliding into the rod holder 224 (where the table structure 260 is then contained in the containment frame 223) and secondly by the base structure 220 sliding on the rails 211, 212 of the mounting structure 210.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Instead of having the cam track 235 around the locking wheel 232 to prevent rotation of the support rod 231, it may be possible to have an elongate channel in the base structure 220 that accommodates a corresponding notch of the locking wheel. When the notch reaches the end of the elongate channel (i.e. in the fully slid out, further deployed position), it could then rotate in a transverse channel (in the base structure and mounting structure). It is noted that the notch being in the transverse channel would prevent the notch from sliding in the elongate channel and therefore prevent sliding of the table structure 260 (in relation to both the base structure and mounting structure) if the table structure 260 were rotated away from the "non-rotated" position.

The locking pin 242 may be mounted to a rotatable latch such that it rotates with respect to the latch axis between the disengaged and engaged positions.

The cam follower 244 may be mounted on a swing arm so as to rotate with respect to the swing arm axis between the near and far positions.

As another alternative, the support rod 231 may be rotatably fixed to the base structure 220 and the table slide structure 250 may be rotatably mounted on the support rod 231. In this example, the locking wheel 232 may have a first cam follower on it that engages with an angled cam surface (part of a cam track) on the table structure 260. A corresponding locking member 242 may be located on the table slide structure 250 and can lock with the locking wheel 232 when the table slide structure 250 is rotated relative to the support rod 231 into a rotated position. Locking of the two locking members 232, 242 may be achieved by translating the table structure 260 and, by the angled cam track, causing the table structure 260 and table slide structure 250 to shift longitudinally in relation to the support rod 231. The locking wheel 232 may also have a second cam follower that engages with a cam receiver on the table structure 260. These two cam elements engage when the table structure 260 is in a vertical "non-rotated" position to prevent the table structure 260 translating when not in the horizontal "rotated" position.

In this embodiment, looking at the wording/features of the claims; the base structure includes the base structure 220 and the support rod 231, the support structure is provided by the table slide structure 250, first locking member is corresponding locking member 242 and the second locking member is the locking wheel 232.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A table arrangement comprising:
   a base structure,
   a support member, rotatably mounted to the base structure such that the support member can rotate between first and second rotation configurations, and
   a table element, having a table surface, the table element being translatably mounted to the support member such that the table element can translate transversely to the support member, between first and second transverse positions,
   wherein the table arrangement also comprises a locking mechanism comprising:
   a first locking member, and
   a second locking member,
   wherein the first locking member is connected to the support member such that it rotates with the support member between non-aligned and aligned configurations with respect to the second locking member, and
wherein the first or second locking member is translatably mounted with respect to the other locking member such that the first or second locking member can translate between a first engagement position and a second engagement position,
wherein, when the support member is rotated towards the second rotation configuration, the first locking member rotates towards the aligned configuration, and wherein, when the first locking member is in the aligned configuration, the first or second locking member can translate into the second engagement position.

2. A table arrangement as claimed in claim 1, wherein the table element is mounted to the support member such that it rotates with the support member, when the support member rotates between first and second rotation configurations.

3. A table arrangement as claimed in claim 1, wherein the support member is rotatably mounted to the base structure such that the support member rotates between the first and second rotation configurations.

4. A table arrangement as claimed in claim 1, wherein the table arrangement further comprises:
a first abutment member connected to the table element, and
a second, corresponding abutment member connected to the first or second locking member,
wherein, the first or second abutment member is translatably mounted such that it can translate between an abutting position, where the abutment members abut such that the table element is prevented from translating between the first and second transverse positions, and a non-abutting position, where the abutment members do not abut, and
wherein, when the first or second abutment member is translated from the abutting position to the non-abutting position, the first or second locking member is caused to translate from the first engagement position to the second engagement position.

5. A table arrangement as claimed in claim 4, wherein one of the first and second abutment members is a first cam surface and the other of the first and second abutment members is a cam follower.

6. A table arrangement as claimed in claim 5, wherein the cam surface is angled so as to have both a transverse and a longitudinal component.

7. A table arrangement as claimed in claim 5, wherein the table arrangement further comprises a second cam surface, adjacent the first cam surface, such that the cam follower can follow the second cam surface after following the first cam surface, and wherein the second cam surface urges the first or second abutment member away from the abutting position.

8. A table arrangement as claimed in claim 7, wherein the support member defines a longitudinal axis and the second cam surface is transverse to the longitudinal axis of the support member, such that the cam follower follows the first and second cam surfaces as the table element moves between first and second transverse positions.

9. A table arrangement as claimed in claim 5, wherein the first abutment member is the first cam surface and the second abutment member is the cam follower.

10. A table arrangement as claimed in claim 4, wherein the second abutment member is connected to the first or second locking member by a locking rod, extending longitudinally through the support member.

11. A table arrangement as claimed in claim 4, wherein the second locking member is rotatably mounted with respect to the second abutting member such that, as the support member is rotated, the second abutting member also rotates, but the second locking member is prevented from rotating.

12. A table arrangement as claimed in claim 11, wherein the second locking member is prevented from rotating by the base structure.

13. A table arrangement as claimed in claim 1, wherein the first or second locking member is biased towards the first engagement position.

14. A table arrangement as claimed in claim 1, wherein the support member is translatably mounted to the base structure, such that the support member can translate longitudinally between first and second longitudinal positions.

15. A table arrangement as claimed in claim 14, wherein the support member is prevented from rotating between first and second rotation configurations when the support member is in at least one position other than the second longitudinal position.

16. A table arrangement as claimed in claim 15, wherein the support member is prevented from rotating when the support member is in any longitudinal position between the first and second longitudinal positions, other than the second longitudinal position.

17. A table arrangement as claimed in claim 14, wherein the support member is prevented from translating between first and second longitudinal positions when the support member is in at least one configuration other than the first rotation configuration.

18. A table arrangement as claimed in claim 17, wherein the support member is prevented from translating when the support member is in any rotation configuration between the first and second rotation configurations, other than the first rotation configuration.

19. A table arrangement as claimed in claim 14, wherein the table arrangement further comprises:
a first slide element connected to the base structure, and
a corresponding, second slide element connected to the support member,
wherein, when the support member is in the first rotation configuration the second slide element aligns with the first slide element and is able to slide with respect to it.

20. A table arrangement as claimed in claim 19, wherein the first slide element is a cam follower and the second slide element is a curved cam track.

21. A table arrangement as claimed claim 1, wherein the table arrangement further comprises a mounting structure and wherein the base structure is translatably mounted to the mounting structure such that the base structure can translate between stowed and deployed positions.

22. An aircraft seat module or aircraft comprising a table arrangement comprising:
a base structure,
a support member, rotatably mounted to the base structure such that the support member can rotate between first and second rotation configurations, and
a table element, having a table surface, the table element being translatably mounted to the support member such that the table element can translate transversely to the support member, between first and second transverse positions,
wherein the table arrangement also comprises a locking mechanism comprising:
a first locking member, and
a second locking member, wherein the first locking member is connected to the support member such that it rotates with the support member between non-aligned and aligned configurations with respect to the second locking member, and wherein the first or second locking member is translatably mounted with respect to the other locking member such that the first or second locking member can translate between a first engagement position and a second engagement position, wherein, when the support member is rotated towards the second rotation configuration, the first locking member rotates towards the aligned configuration, and wherein, when the first locking member is in the aligned configuration, the first or second locking member can translate into the second engagement position.

23. A method of deploying a table element of a table arrangement comprising:
   a base structure,
   a support member, rotatably mounted to the base structure such that the support member can rotate between first and second rotation configurations, and
   a table element, having a table surface, the table element being translatably mounted to the support member such that the table element can translate transversely to the support member, between first and second transverse positions,
wherein the table arrangement also comprises a locking mechanism comprising:
   a first locking member, and
   a second locking member,
   wherein the first locking member is connected to the support member such that it rotates with the support member between non-aligned and aligned configurations with respect to the second locking member, and
   wherein the first or second locking member is translatably mounted with respect to the other locking member such that the first or second locking member can translate between a first engagement position and a second engagement position, wherein, when the support member is rotated towards the second rotation configuration, the first locking member rotates towards the aligned configuration, and wherein, when the first locking member is in the aligned configuration, the first or second locking member can translate into the second engagement position, the method comprising the following steps:
   rotating the support member from the first rotation configuration to the second rotation configuration,
   thereby causing the first locking member to move to align with the second locking member,
   then moving the table element transversely in relation to the support member,
   thereby causing the first or second locking member to move from the first engagement position, to the second engagement position with respect to the other locking member.

24. A method of deploying a table element as claimed in claim 23, wherein the first or second locking member in the second engagement position prevents the first locking member from moving to the non-aligned configuration with respect to the second locking member, and thereby prevents the support member from rotating from the second rotation configuration to the first rotation configuration.

25. A method of deploying a table element as claimed in claim 23, wherein the method further comprises the step of translating the support member in relation to the base structure prior to rotating the support member.

26. A method of deploying a table element as claimed in claim 23, wherein the method further comprises the step of translating the base structure in relation to a mounting structure of the table arrangement prior to rotating the support member.

27. A method of stowing a table element of a table arrangement comprising:
   a base structure,
   a support member, rotatably mounted to the base structure such that the support member can rotate between first and second rotation configurations, and
   a table element, having a table surface, the table element being translatably mounted to the support member such that the table element can translate transversely to the support member, between first and second transverse positions,
wherein the table arrangement also corn rises a locking mechanism comprising:
   a first locking member, and
   a second locking member,
   wherein the first locking member is connected to the support member such that it rotates with the support member between non-aligned and aligned configurations with respect to the second locking member, and
   wherein the first or second locking member is translatably mounted with respect to the other locking member such that the first or second locking member can translate between a first engagement position and a second engagement position, wherein, when the support member is rotated towards the second rotation configuration, the first locking member rotates towards the aligned configuration, and wherein, when the first locking member is in the aligned configuration, the first or second locking member can translate into the second engagement position, the method comprising the following steps:
   moving the table element transversely in relation to the support member,
   thereby causing the first or second locking member to move from the second engagement position to the first engagement position with respect to the other locking member,
   then rotating the support member from the second rotation configuration to the first rotation configuration,
   thereby causing the first locking member to move to the non-aligned configuration with respect to the second locking member.

28. A method of stowing a table element as claimed in claim 27, wherein the first or second locking member in the first engagement position allows the first locking member to move to the non-aligned configuration with respect to the second locking member, and thereby allows the support member to rotate from the second rotation configuration to the first rotation configuration.

29. A method of stowing a table element as claimed in claim 27, wherein the method further comprises the step of translating the support member in relation to the base structure after rotating the support member.

30. A method of stowing a table element as claimed in claim 27, wherein the method further comprises the step of translating the base structure in relation to a mounting structure of the table arrangement after rotating the support member.

* * * * *